United States Patent
Hoffman et al.

(10) Patent No.: US 10,913,128 B1
(45) Date of Patent: Feb. 9, 2021

(54) WELDING WIRE LIGHT

(71) Applicants: Joseph Hoffman, Jackson, MI (US); Edward L Cooper, Jackson, MI (US)

(72) Inventors: Joseph Hoffman, Jackson, MI (US); Edward L Cooper, Jackson, MI (US)

( * ) Notice: Subject to any disclaimer, the term of this patent is extended or adjusted under 35 U.S.C. 154(b) by 324 days.

(21) Appl. No.: 15/841,532

(22) Filed: Dec. 14, 2017

Related U.S. Application Data

(60) Provisional application No. 62/434,273, filed on Dec. 14, 2016.

(51) Int. Cl.
| | |
|---|---|
| *B23K 9/12* | (2006.01) |
| *B23K 9/32* | (2006.01) |
| *B23K 10/00* | (2006.01) |
| *F21V 15/04* | (2006.01) |
| *F21V 21/088* | (2006.01) |
| *F21V 21/14* | (2006.01) |
| *F21S 41/141* | (2018.01) |
| *F21V 19/02* | (2006.01) |
| *F21Y 115/10* | (2016.01) |

(52) U.S. Cl.
CPC ............... *B23K 9/32* (2013.01); *B23K 10/00* (2013.01); *F21S 41/141* (2018.01); *F21V 15/04* (2013.01); *F21V 19/02* (2013.01); *F21V 21/0885* (2013.01); *F21V 21/145* (2013.01); *F21Y 2115/10* (2016.08)

(58) Field of Classification Search
CPC ......... B23K 9/32; B23K 10/00; F21V 21/145; F21V 15/04; F21V 21/0885; F21V 19/02; F21S 41/141; F21Y 2115/10
See application file for complete search history.

(56) References Cited

U.S. PATENT DOCUMENTS

| | | | | |
|---|---|---|---|---|
| 3,553,416 | A * | 1/1971 | Schmiege | B23K 11/248 219/56.1 |
| 2007/0131664 | A1* | 6/2007 | Fisher | B23K 9/32 219/136 |
| 2008/0002416 | A1* | 1/2008 | Liaw | F21V 29/70 362/473 |
| 2010/0140240 | A1* | 6/2010 | Turner | B23K 9/127 219/124.4 |
| 2010/0271814 | A1* | 10/2010 | Messinger | H02J 7/0072 362/183 |
| 2011/0121727 | A1* | 5/2011 | Sharrah | F21L 4/00 315/32 |
| 2014/0134580 | A1* | 5/2014 | Becker | G09B 19/003 434/234 |
| 2014/0166631 | A1* | 6/2014 | Rozmarynowski | B23K 10/00 219/121.48 |
| 2015/0328716 | A1* | 11/2015 | Duart Lvarez Cienfuegos | B23K 23/00 164/54 |

(Continued)

*Primary Examiner* — David P Angwin
*Assistant Examiner* — Bob Zadeh
(74) *Attorney, Agent, or Firm* — Ronald R. Kilponen

(57) ABSTRACT

A welding wire light is shown and described. The welding wire light can be used to align the welding tip and the wire in automated welding processes. This welding wire light can allow more accurate and precise alignment of these elements resulting in better welded results. Several embodiments are disclosed for illuminating these elements which are especially helpful on automated welding process lines when components need to be replaced or adjusted quickly and accurately.

2 Claims, 4 Drawing Sheets

(56) References Cited

U.S. PATENT DOCUMENTS

2016/0125764 A1* 5/2016 Becker .................. G09B 19/24
434/234
2018/0333195 A1* 11/2018 Greep .................. A61B 18/148

* cited by examiner

WELDING WIRE LIGHT

CROSS REFERENCE TO RELATED APPLICATIONS

This application claims the benefit of U.S. Provisional Application for Patent application No. 62/434,273 filed Dec. 14, 2016 entitled "Welding Wire Light". The above identified Provisional Application for Patent is herein incorporated by reference in it's entirety to provide continuity of disclosure.

FIELD

The present version of these embodiments relate generally to the field of lights for illumination of a wire welding wand for calibration and adjustment of the welding components.

BACKGROUND

These embodiments relate to illumination devices for wire welding wands, and more particularly to a device that can aid in the setup, calibration or adjustment of the wire welding wand.

Automated welding is something that can now be reliably utilized for many processes. In a typical process, the materials to be welded can be placed on a line. The line moves and can even arrange the work pieces for welding. The welding can be accomplished via the use of a wire welder and automatic feeder of the wire such that the work pieces can be joined together. The joined work pieces can then be moved further along the line where more pieces can be wire welded or additional processes can occur. These processes are typically done one after another for many high volume parts. The only time the line would need to be stopped is if there is a problem that requires adjustment, calibration or replacement of parts. Many times these processes are computerized and automatic and therefore do not require the lighting that would be necessary were a human hand welding the work pieces together.

When errors occur or components need to be replaced then human maintenance crew is required to manually replace the failed or failing components. The maintenance crew must then calibrate the line tools such that the line can be started again. Additional light is many times necessary to manually calibrate, align the wire, work pieces and welding tip. Human action is needed to correct, replace and re-calibrate these tools and supplemental light aids in the accuracy and speed in which these actions can occur. A hand held light can be used but in darkened areas the shadows cast by a hand held light on the machine elements can cause mis-alignment of the elements. The alignment or replacement must be repeated and manufacturing time is lost on the line. A light source that aids the user in replacing components and aligning components without troublesome shadows would aid the user. The equipment can thus be repaired or aligned quicker with greater accuracy aiding in efficient manufacturing processes.

For the foregoing reasons, there is a need for a Welding Wire Light that can be affixed to the welding wand to allow easier and more accurate alignment of the wire, welding tip and work pieces.

SUMMARY

In view of the foregoing disadvantages inherent in the area of aligning and adjusting a wire welder, wire and workpiece, there is a need for wire welding light.

A first objective of these embodiments is to provide a device that will fit a large majority of the existing welding wands.

Another objective of these embodiments is to provide a device that will provide an easier method to align the welding head tip, wire and work piece(s).

It is yet another objective of these embodiments to provide a device that provides a more accurate method to align the welding head tip, wire and work piece(s).

It is a still further object of these embodiments to provide a device that makes the work of aligning the welding head tip, wire and work piece(s) less time consuming.

These together with other objectives of these embodiments, along with various features of novelty which characterize these embodiments, are pointed out with particularity in this application forming a part of this disclosure. For a better understanding of these embodiments, the operating advantages and the specific objectives attained by its uses, reference should be had to the accompanying drawings and descriptive matter in which there is illustrated a preferred embodiment.

DETAILED DESCRIPTION OF THE PREFERRED EMBODIMENTS

Figure 1:
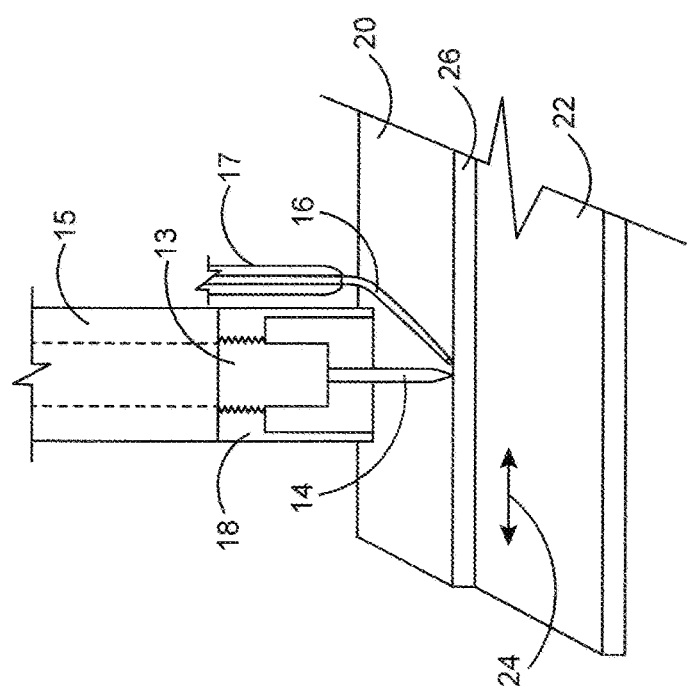
FIG. 1 shows a side perspective view drawing of a wand with a head and tip adjacent to the wire and work pieces ready to be welded.

Referring to the drawings in detail wherein like elements are indicated by like numerals, there is shown in FIG. 1 a wire welding head 13 attached to a tip 14 and located within an outer housing 18. The head 13, tip 14 and wand 15 shown in FIG. 1 is an example of a standard welding head herein. The outer housing 18 can be screwed (in this embodiment) onto and off of the wand 15. The outer housing 18 is removable such that the tip 14 can be replaced if needed. This is but one embodiment of the outer housing 18 attachment method to the wand 15. It should be understood that various other methods known in the art are used to attach an outer housing 18 to a wand 15, head 13 and tip 14.

As can be seen in FIG. 1, the wire 16 is located relatively close to the end of the tip 14 for welding of the work piece one 20 to work piece two 22 to form a weld joint 26. Generally the work pieces 20, 22 are moved past the weld tip 14 and wire 16 where the wire 16 is melted to form the weld joint 26.

The wire 16 is fed into the housing 17 which runs back to a wire feeder (not shown). The wire 16 generally is fed from a large feed roll and as can be imagined, the diameter of the wire loops on the rolls can vary depending upon the "depth" and position of the wire on the feed roll. Because the wire 16 is rolled, stored and fed from a varying diameter spool on the feed roll, it can take a slightly different angles and locations as it is fed from the housing 17 relative to the tip 14. The wire 16 needs to be located at a position that is optimized for the welding process and materials being welded together, speed and feeds of the work pieces and other factors. This position can vary as the wire 16 is fed into the welding process. Therefore, the tip 14 and the wire 16 may need to be adjusted or calibrated relative to one another to achieve the most desirable welding results and optimum manufacturing speeds.

When the components begin to show wear or fail, then the failed or failing components must be replaced or repaired and this is when human intervention is most commonly needed. Since this automated welding system many times operates via computer, lighting is many times not needed or the minimal amount of light is used as many of the computers do not need visual confirmation of the processes.

This low lighting condition can cause problems with human technicians who must troubleshoot, repair, replace and re-calibrate the welding head 13, wand 15 and wire 16 and other components. The technicians need good light with which to align and calibrate the system so that it operates correctly. This is difficult because many automated systems lack sufficient lighting for repair or maintenance personnel.

Some technicians can use a flashlight or head lamp to calibrate the location of the tip 14 and wire 16. This many times is not the most efficacious method for adjustment as a flashlight will project light at an angle resulting in deceptive shadows thereby making precise adjustments and calibrations more difficult. Flashlights also require a hand to hold them—resulting in only one free hand to make the needed adjustments or repairs. Since the wands 15 are many times not located at the most convenient locations for calibration, the flashlight method can result in more time getting the best results. Similarly, head lamps have many of the same issues as hand held flashlights but do allow the use of two hands for adjustments. The head lamps do require the head to be pointing where the light is needed. The beam may be too narrow to illuminate adequately the area that is necessary to complete the task. Like the handheld flashlight, the head lamp can cast unusual shadows on the components making it more difficult to optimally align the components.

There is some art that replaces the tip 14 with a laser light source but this also is not optimum. The laser light shows where the tip 14 will theoretically be located but does nothing to account for the variations in the wire 16 location. There is variation to the wire 16 location as discussed earlier regarding the turning of the wire 16 due to the set taken from the location of the wire 16 on the storage spool. The wire spool (not shown) is very large in diameter and the wire 16 is rolled on the spool resulting in slightly different bends to loops in the wire 16. The wire could be thought of as tracks in an album, with the smaller diameter loops located near the center and larger diameter loops near the outer edge. This variation in the diameter of the wire 16 loops necessitates these adjustments to the tip and work pieces.

This shows that there is a great need for a better illumination method for the tip 14 relative to the wire 16 of a wire welding device.

Figure 2:
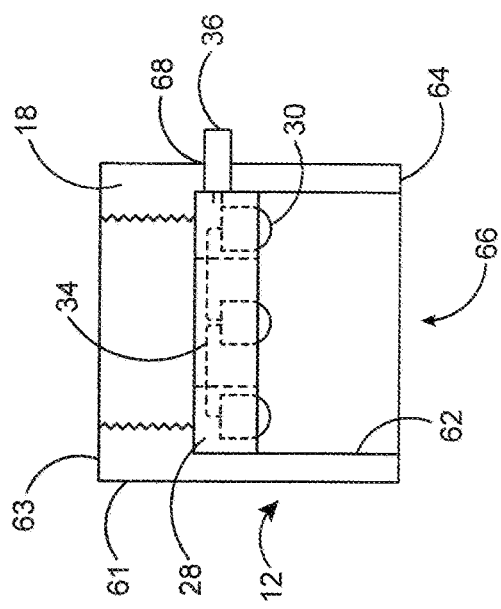
FIG. 2 shows a side view of one embodiment of the wire welding light located within an outer housing.

FIG. 2 shows a side view of one embodiment of a welding wire light 12. This light 12 can be either an independent unit consisting of a circular disk 28 or built or molded into a outer housing 18. The disk 28 can be formed to house at least one LED 30, this embodiment shows three LED's 30 located approximately equidistant from one another along a circumference. The disk 28 also has accommodation for housing a power supply 32 interconnected with wiring 34 and switch 36 for turning the LED's on and off. This disk 28 is sized such that it can be inserted into a standard outer housing 18 for the wand 15, FIG. 1. The disk 28 has a hole 38, FIG. 3, through which the tip 14 and head 13 is inserted when the disk 28 or outer housing 18 and disk 28 are installed on the wand 15. This allows the adjuster or calibrator to have a much better and more true view of the wire 16 relative to the tip 14 and work pieces 22, 20. The light from the LED's 30 surround the tip with less likelihood of ghosting or unusual shadows which make the alignment of the tip 14 relative to the wire 16 and work pieces 20, 22 more true resulting in better accuracy and less down time.

The outer housing 18 is shown having a side wall 61 on the exterior surface, an inner surface 62, a first end 63 and second end 64. A hole 66 is approximately centered in the outer housing 18 and extends from the first end 63 to the second end 64. A second hole 68 can be seen in the side wall 61 extending from the inner surface 62 approximately perpendicular to the hole 66.

Figure 3:
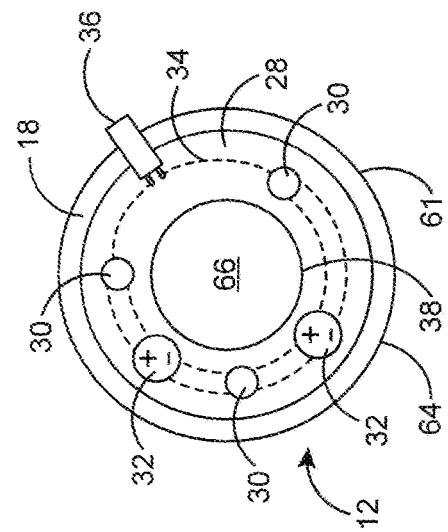
FIG. 3 shows an second end or bottom view of the embodiment shown in FIG. 2.

FIG. 3 shows the disk 28 located within the outer housing 18. This bottom view of the device more clearly shows the LED's 30 located approximately equidistant from one another. Also can be seen power supplies 32 interconnected with the wiring 34, LED's 30 and switch 36 for turning the light source on and off. The switch 36 can penetrate the outer surface of the outer housing 18 as shown. Alternatively, the switch could be engaged and then the device could be placed into the outer housing 18 where it would remain in the on position until removed and turned off. While this embodiment shows two power supplies 32 and three LED's 30, it should be understood that more or fewer power supplies 32 and LED's 30 could be used depending upon the user's preferences and the equipment conditions. Alternatively, the power supply 32 could be a rechargeable battery.

The embodiments shown in FIGS. 2 and 3 could consist of both the outer housing 18 and the light source disk 28, wiring 34, LED's 30 and switch 36 combining into one element such that the outer housing 18 is molded or co-molded with the disk 28 and light emitting elements or LED's 30. This would require the original outer housing 18 to be removed and replaced with the welding wire light 12 shown here, FIGS. 2, 3.

Alternatively, the outer housing 18 could be removed from the wand 15 that needs calibration and the disk 28 with light emitting elements, power source and switch could be inserted into the removed outer housing 18 and then installed back onto the wand 15 and head 13 for calibration. When the calibration, repair, replacement is complete, the outer housing 18 is removed. The disk 28 would then be removed from the outer housing 18 and the outer housing would be reinstalled on the wand 15 and head 13.

Figure 4:
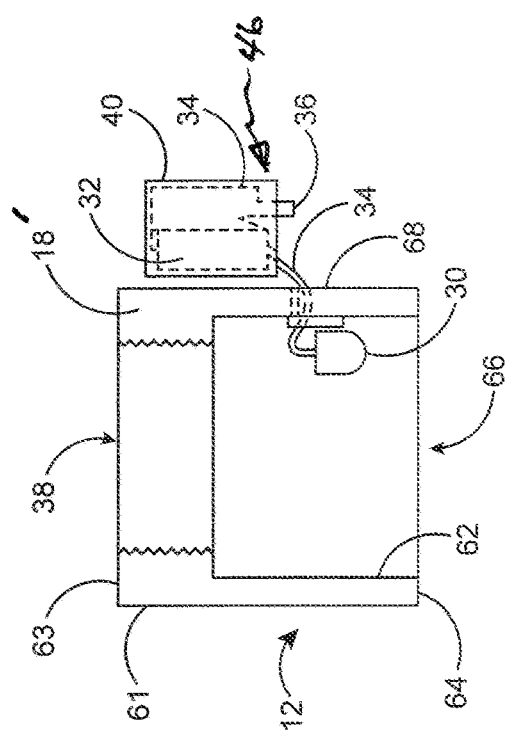
FIG. 4 shows a side view of another embodiment of the wire welding light located within in an outer housing with components on the outside of the outer housing.

FIG. 4 shows a side view of another embodiment of the welding wire light 12. This embodiment comprises a single LED 30 that gets affixed to the inside of the outer housing 18'. There is a hole for passage of wiring 34 and this wiring is connected to the power supply 32.

The power supply 32, switch 36 and wiring 34 is partially located within the housing 40. Housing 40 can then be affixed to outer housing 18'. This embodiment would be used to temporarily replace the original outer housing 18 of the wand 15 and head 13 that needed adjustment. When the adjustment was complete the outer housing 18' and light elements 46 would be removed and the original outer housing 18 re-installed on the wand 15. Light Elements 46 include the housing 40, wiring 34, switch 36 and LED 30 which can be affixed by first attachment 42 and second attachment 44 to outer housing 18'.

Figure 5:
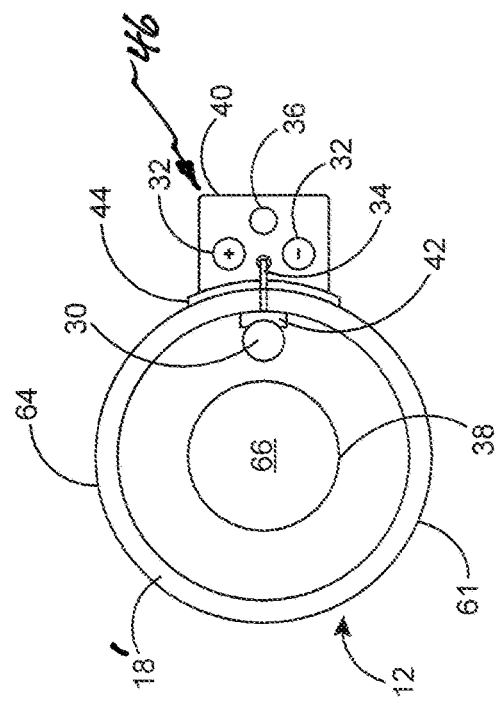
FIG. 5 shows an second end view of the embodiment shown in FIG. 4.

FIG. 5 shows an end view of the welding wire light 12 shown in FIG. 4. It can be seen that the LED 30 is affixed to the interior of the outer housing 18' via a first attachment 42. First attachment 42 could be a temporary adhesive such as double sided tape or a more permanent method for attachment. Likewise, second attachment 44 secures the housing 40 to the exterior surface of the outer housing 18'. This too could be double sided tape or a more permanent method for attachment. This more permanent attachment method would be more convenient if the original outer housing 18 was removed from the wand and this outer housing 18' shown in FIGS. 4 and 5 was installed and used to perform alignment and calibration of the tip 14 and the wire 16.

While the embodiments in FIG. 5 show one LED 30 it should be understood that more LED's could be utilized and affixed and wired in a similar manner to that which is shown and described.

Figure 6:
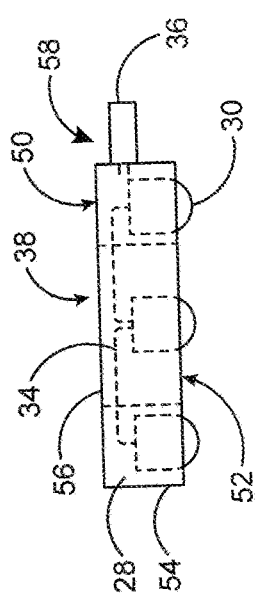
FIG. 6 shows a side view of the light module.

FIG. 6 shows aside view of the light module 58 removed from the outer housing 18. Also shown is the top 50 and bottom 52 of the light module 58. Also shown is the outer side 54 and the inner side 56.

Figure 7:
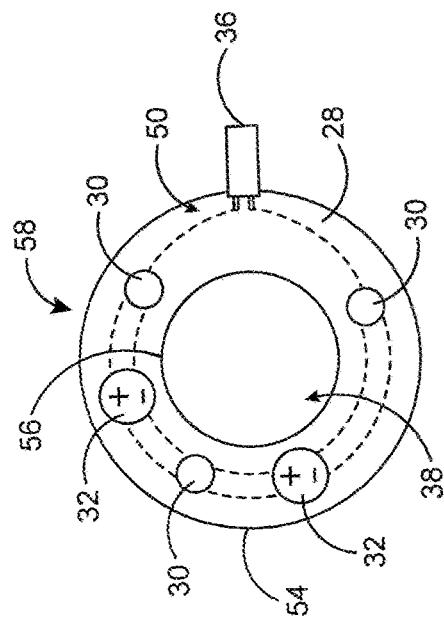
FIG. 7 shows a top view of the light module of FIG. 6.

FIG. 7 likewise shows a top view of the light module 58 removed from the outer housing 18.

It should be noted that while these embodiments show an outer housing 18 and 18' that is threaded on to the wand 15, various other known methods exist for removably attaching outer housing 18 and 18' to wand 15. It is anticipated that these other known methods for attachment could be used with the embodiments disclosed here to utilize the welding wire light 12 with other wands 15.

It will now be apparent to those skilled in the art that other embodiments, improvements, details and uses can be made consistent with the letter and spirit of the foregoing disclosure and within the scope of this application.

The invention claimed is:

1. A welding wire light device, the welding wire light device comprising:
    a circular outer housing having a center, the outer housing having a side wall and an inner surface, a first end, a second end and a hole, the hole extending through the center from the first end to the second end, the first end configured to affix to a standard welding head, the second end open, a second hole through the side wall, the second hole extending from the inner surface through the side wall, the second hole perpendicular to the center;
    a light element, the light element having a housing, the housing affixed to the side wall of the outer housing with an attachment;
    a power supply, the power supply contained within the housing;
    a switch, the switch located partially within the housing and partially extending from the housing;
    wiring, the wiring interconnecting the power supply and the switch; and
    at least one LED, the LED located on the inner surface of the housing near the second hole, an attachment, the attachment affixed to the LED, the attachment affixed to the inner surface, the wiring connected to the LED, the wiring extending through the second hole and into the housing, the wiring interconnecting the LED to the power supply and the switch wherein the switch turns the LED on and off.
2. The welding wire light of claim 1, further comprising:
    the number of LED's is three, the LED's are affixed with a first attachment to the inner surface, the LED's are located equidistance from one another.

* * * * *